United States Patent
France et al.

(10) Patent No.: US 7,247,241 B2
(45) Date of Patent: *Jul. 24, 2007

(54) PROCESS FOR TREATING LIPOPHILIC FLUID

(75) Inventors: Paul Amaat Raymond Gerard France, West Chester, OH (US); Arseni Valerevich Radomyselski, Loveland, OH (US); Dewey Edward Burton, Fairfield, OH (US)

(73) Assignee: The Procter & Gamble Company, Cincianati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/199,977

(22) Filed: Oct. 28, 2005

(65) Prior Publication Data

US 2006/0027493 A1   Feb. 9, 2006

Related U.S. Application Data

(63) Continuation of application No. 10/238,271, filed on Sep. 10, 2002, now Pat. No. 6,955,761.

(60) Provisional application No. 60/318,438, filed on Sep. 10, 2001.

(51) Int. Cl.
  *B01D 15/00* (2006.01)
  *D06L 1/00* (2006.01)

(52) U.S. Cl. ............ 210/660; 210/689; 210/690; 210/694; 210/799; 210/335; 210/806; 210/807; 502/402; 502/407; 8/137; 8/142

(58) Field of Classification Search ............ None
See application file for complete search history.

(56) References Cited

U.S. PATENT DOCUMENTS

| | | | |
|---|---|---|---|
| 3,156,647 A | 11/1964 | Gould et al. | |
| 3,231,324 A | 1/1966 | Young et al. | |
| 3,395,086 A | 7/1968 | Victor et al. | |
| 3,591,010 A | * 7/1971 | Pall et al. | 210/493.1 |
| 3,619,120 A | 11/1971 | Conlisk et al. | |
| 3,658,459 A | 4/1972 | Gartian et al. | |
| 3,692,467 A | 9/1972 | Durr et al. | |
| 3,839,176 A | 10/1974 | McCoy et al. | |
| 4,108,599 A | 8/1978 | Coll-Palagos et al. | |
| 4,277,336 A | 7/1981 | Henschel, Jr. et al. | |
| 4,584,092 A | 4/1986 | Kanematu et al. | |
| 4,604,205 A | 8/1986 | Ayers et al. | |
| 4,606,824 A | 8/1986 | Chu et al. | |
| 4,664,754 A | 5/1987 | Caputi et al. | |
| 4,678,571 A | 7/1987 | Hosaka et al. | |
| 5,057,240 A | 10/1991 | Madore et al. | |

(Continued)

FOREIGN PATENT DOCUMENTS

DE    37 39711 A1    6/1989

(Continued)

OTHER PUBLICATIONS

International Search Report.

*Primary Examiner*—Krishnan S. Menon
(74) *Attorney, Agent, or Firm*—Kim William Zerby; Steven W. Miller

(57) ABSTRACT

Process for treating lipophilic fluids employing filters, more particularly, multifunctional filters that are capable of removing as well as adding components to lipophilic fluids being filtered are provided by the present invention.

19 Claims, 3 Drawing Sheets

U.S. PATENT DOCUMENTS

| | | | |
|---|---|---|---|
| 5,273,649 A * | 12/1993 | Magnusson et al. | 210/232 |
| 5,510,029 A | 4/1996 | Benian | |
| 5,622,630 A | 4/1997 | Romano | |
| 5,882,506 A | 3/1999 | Ohsol et al. | |
| 5,942,007 A | 8/1999 | Berndt et al. | |
| 6,056,789 A | 5/2000 | Berndt et al. | |
| 6,059,845 A | 5/2000 | Berndt et al. | |
| 6,063,135 A | 5/2000 | Berndt et al. | |
| 6,086,635 A | 7/2000 | Berndt et al. | |
| 6,310,029 B1 | 10/2001 | Kilgour et al. | |
| 6,312,476 B1 * | 11/2001 | Perry et al. | 8/142 |
| 6,313,079 B1 | 11/2001 | Murphy et al. | |
| 6,368,359 B1 | 4/2002 | Perry et al. | |
| 2001/0004062 A1 | 6/2001 | Rutledge et al. | |
| 2002/0017493 A1 | 2/2002 | Ehrnsperger et al. | |
| 2002/0038480 A1 | 4/2002 | Deak et al. | |
| 2002/0184715 A1 | 12/2002 | Taylor et al. | |

FOREIGN PATENT DOCUMENTS

| | | |
|---|---|---|
| EP | 0 543 665 A1 | 5/1991 |
| EP | 0 669 152 A1 | 8/1995 |
| EP | 0 841 362 A2 | 5/1998 |
| GB | 966 787 A | 8/1964 |
| GB | 1 296 278 | 11/1972 |
| JP | 61-085995 | 5/1986 |
| JP | 03-90601 U | 12/1989 |
| JP | 05123496 | 5/1993 |
| JP | 07-155522 A | 6/1995 |
| JP | 07-232019 A | 9/1995 |
| JP | 07-328621 A | 12/1995 |
| JP | 11-206267 A | 8/1999 |
| JP | 11-290838 A | 10/1999 |
| WO | WO 00/68151 A2 | 11/2000 |
| WO | WO 01/06051 A1 | 1/2001 |
| WO | WO 01/27380 A1 | 4/2001 |
| WO | WO 01/34613 A1 | 5/2001 |
| WO | WO 01/34706 A1 | 5/2001 |
| WO | WO 01/93977 A2 | 12/2001 |
| WO | WO 01/94679 A1 | 12/2001 |
| WO | WO 01/44256 A1 | 6/2002 |
| WO | WO 02/077356 A1 | 10/2002 |

* cited by examiner

PROCESS FOR TREATING LIPOPHILIC FLUID

RELATED APPLICATIONS

This application is a Continuation Application of co-pending U.S. application Ser. No. 10/238,271, filed Sep. 10, 2002, which claims priority under 35 U.S.C. §119(e) to U.S. Provisional Application Ser. No. 60/318,438, filed Sep. 10, 2001, now U.S. Pat. No. 6,955,761, Oct. 18, 2005.

FIELD OF THE INVENTION

The present invention relates to processes for treating lipophilic fluids employing filters, more particularly, multifunctional filters that are capable of removing as well as adding components to lipophilic fluids being filtered are provided by the present invention.

BACKGROUND OF THE INVENTION

Conventional filter materials are good at removing particulates and/or other materials present in a filtrate. However, conventional filter material manufacturers do not appreciate the opportunity of not only removing agents from filtrates, but also adding agents to filtrates.

Accordingly, there is a need, especially in consumable filtering processes, for a filter that is capable of removing from and adding to a filtrate various agents.

SUMMARY OF THE INVENTION

The present invention fulfills the need described above by providing a multifunctional filter comprised of a filter material that is capable of removing from and adding to a filtrate coming into contact with the filter material various agents.

In one aspect of the present invention, a filter comprising:
  a. a removal component that is capable of removing a material from a filtrate; and
  b. an addition component that is capable of adding a material to a filtrate is provided.

In another aspect of the present invention, a filter comprising:
  a. a housing comprising an in-flow port through which a filtrate enters the filter and an out-flow port through which the filtrate exits the filter;
  b. a filtering material housed within said housing, wherein the filtering material is pleated in a fanfold manner and positioned within the filter such that the filtrate contacts the filtering material as it passes from the in-flow port to the out-flow port;
  c. a removal component for removing a material from the filtrate, wherein the removal component is dispersed throughout and fixed to the filtering material; and
  d. an addition component for adding a material to the filtrate is provided.

In still another aspect of the present invention, an apparatus comprising:
  a. a filter according to the present invention; and
  b. a filtrate source in fluid communication with the filter such that the filtrate contacts the filter.

In yet another aspect of the present invention, a process for treating a filtrate comprising contacting the filter according to with the present invention with the filtrate.

In still yet another aspect of the present invention, a filtrate produced by the process according to the present invention.

Accordingly, the present invention provides a multifunctional filter, an apparatus employing such, a process using the multifunctional filter to treat a filtrate and a filtrate produced by such a process.

DETAILED DESCRIPTION

Definitions

Figure 1:
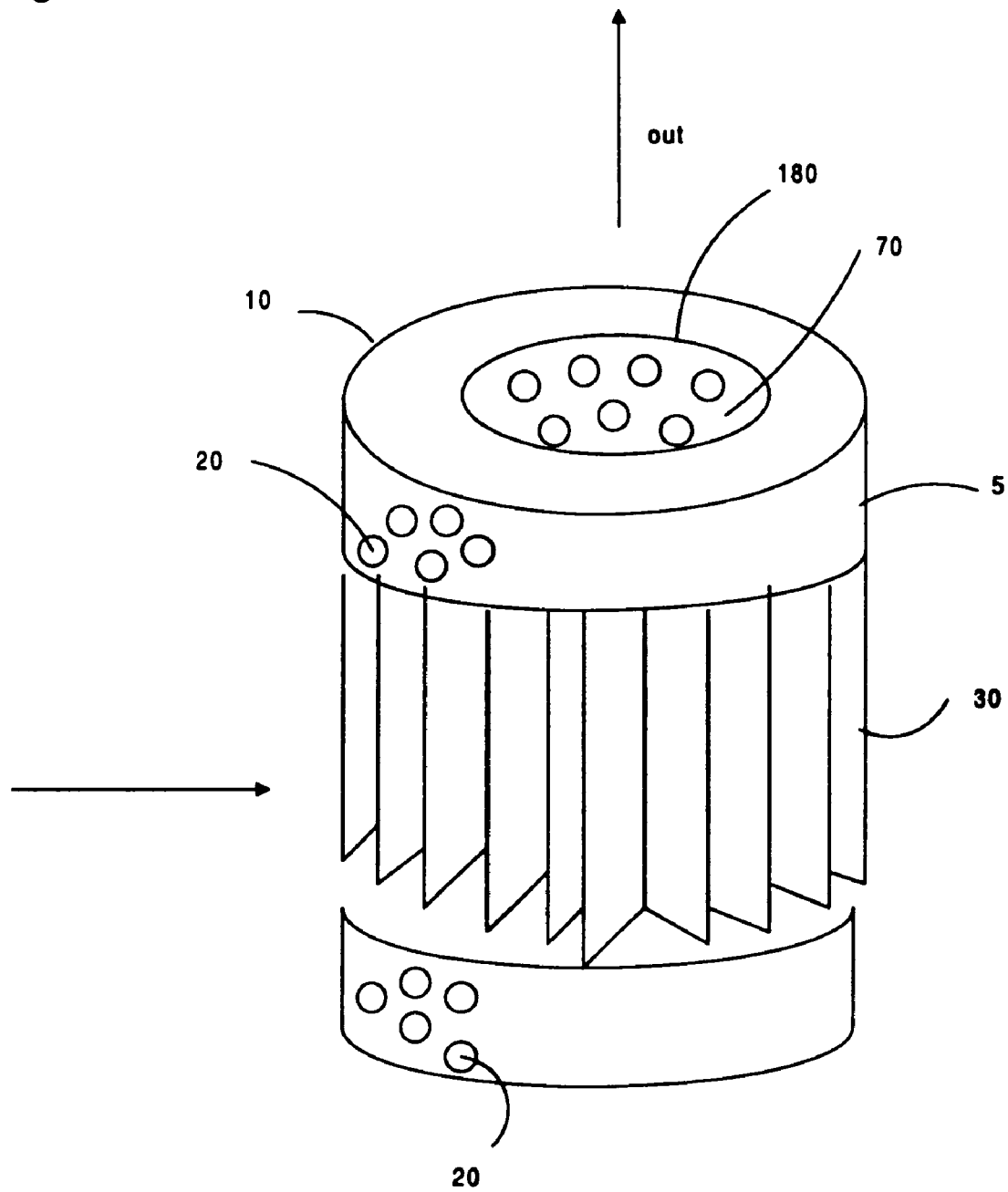
FIG. 1 is a perspective view, partly in section, of one embodiment of a multifunctional filter in accordance with the present invention.

"Filter zone" as used herein means the zone in the filter cartridge that contains between the inlet and the outlet an adsorbent and or the filter material.

The term "fabric article" used herein is intended to mean any article that is customarily cleaned in a conventional laundry process or in a dry cleaning process. As such the term encompasses articles of clothing, linen, drapery, and clothing accessories. The term also encompasses other items made in whole or in part of fabric, such as tote bags, furniture covers, tarpaulins and the like.

The term "absorbent material" or "absorbent polymer" used herein is intended to mean any material capable of selectively absorbing or adsorbing water and/or water-containing liquids without absorbing lipophilic fluids as described in detail. In other words, absorbent materials or absorbent polymers comprise a water absorbing agent. In the art they may also be referred to as "responsive gels," "gel," and "polymeric gel." For a list of phase changing gels, see the textbook *Responsive Gels, Volume Transitions II*, Ed K. Dusek, Springer Verlag Berlin, 1993 (herein incorporated by reference). See also, *Thermo-responsive Gels*, Radiat. Phys. Chem., Volume 46, No. 2, pp. 185–190, Elsevier Science Ltd. Great Britain, 1995 (herein incorporated by reference). Super absorbent polymers, also suitable for use with the present invention, are polymeric materials that have an absorption capacity at or above 5 grams/gram. See also, *Superabsorbent Polymers Science and Technology*, edited by Fredric L. Buchholz and Nicholas A. Peppas, American Chemical Society, Washington D.C., 1994 (particularly Chapter 9 by Tadao Shimomura and Takashi Namba entitled "Preparation and Application of High-Performance Superabsorbent Polymers) herein incorporated by reference.

The term "absorbent matrix permeability aid" or "spacer material" or "spacer" used herein is intended to mean any fibrous or particulate material that is, at most, only slightly soluble in water and/or lipophilic fluid.

The term "absorbent matrix" used herein is intended to mean a matrix in any form that is capable of absorbing or adsorbing water. At minimum, it comprises an absorbent material. It may optionally comprise a spacer material and/or a high surface area material.

The term "lipophilic fluid" used herein is intended to mean any nonaqueous fluid capable of removing sebum, as described in more detail herein below.

The term "cleaning composition" used herein is intended to mean any lipophilic fluid-containing composition that comes into direct contact with fabric articles to be cleaned.

It should be understood that the term encompasses uses other than cleaning, such as conditioning and sizing. Furthermore, optional cleaning adjuncts such as additional surfactants other than those surfactants described above, bleaches, and the like may be added to the "cleaning composition". That is, cleaning adjuncts may be optionally combined with the lipophilic fluid. These optional cleaning adjuncts are described in more detail herein below. Such cleaning adjuncts may be present in the cleaning compositions of the present invention at a level of from 0.01% to about 10% by weight of the cleaning composition.

The term "soil" means any undesirable substance on a fabric article that is desired to be removed. By the terms "water-based" or "hydrophilic" soils, it is meant that the soil comprised water at the time it first came in contact with the fabric article, or the soil retains a significant portion of water on the fabric article. Examples of water-based soils include, but are not limited to beverages, many food soils, water soluble dyes, bodily fluids such as sweat, urine or blood, outdoor soils such as grass stains and mud.

The term "capable of suspending water in a lipophilic fluid" means that a material is able to suspend, solvate or emulsify water, which is immiscible with the lipophilic fluid, in a way that the water remains visibly suspended, solvated or emulsified when left undisturbed for a period of at least five minutes after initial mixing of the components. In some examples of compositions in accordance with the present invention, the compositions may be colloidal in nature and/or appear milky. In other examples of compositions in accordance with the present invention, the compositions may be transparent.

The term "insoluble in a lipophilic fluid" means that when added to a lipophilic fluid, a material physically separates from the lipophilic fluid (i.e. settle-out, flocculate, float) within 5 minutes after addition, whereas a material that is "soluble in a lipophilic fluid" does not physically separate from the lipophilic fluid within 5 minutes after addition.

The term "consumable detergent composition" and/or "treating composition" means any composition, that when combined with a lipophilic fluid, results in a cleaning composition according to the present invention.

The term "processing aid" refers to any material that renders the consumable detergent composition more suitable for formulation, stability, and/or dilution with a lipophilic fluid to form a cleaning composition in accordance with the present invention.

The term "mixing" as used herein means combining two or more materials (i.e., fluids, more specifically a lipophilic fluid and a consumable detergent composition) in such a way that a homogeneous mixture is formed. Suitable mixing processes are known in the art. Nonlimiting examples of suitable mixing processes include vortex mixing processes and static mixing processes.

Lipophilic Fluid

The lipophilic fluid herein is one having a liquid phase present under operating conditions of a fabric/leather article treating appliance, in other words, during treatment of a fabric article in accordance with the present invention. In general such a lipophilic fluid can be fully liquid at ambient temperature and pressure, can be an easily melted solid, e.g., one which becomes liquid at temperatures in the range from about 0 deg. C. to about 60 deg. C., or can comprise a mixture of liquid and vapor phases at ambient temperatures and pressures, e.g., at 25 deg. C. and 1 atm. pressure. Thus, the lipophilic fluid is not a compressible gas such as carbon dioxide.

It is preferred that the lipophilic fluids herein be nonflammable or have relatively high flash points and/or low VOC (volatile organic compound) characteristics, these terms having their conventional meanings as used in the dry cleaning industry, to equal or, preferably, exceed the characteristics of known conventional dry cleaning fluids.

Moreover, suitable lipophilic fluids herein are readily flowable and nonviscous.

In general, lipophilic fluids herein are required to be fluids capable of at least partially dissolving sebum or body soil as defined in the test hereinafter. Mixtures of lipophilic fluid are also suitable, and provided that the requirements of the Lipophilic Fluid Test, as described below, are met, the lipophilic fluid can include any fraction of dry-cleaning solvents, especially newer types including fluorinated solvents, or perfluorinated amines. Some perfluorinated amines such as perfluorotributylamines while unsuitable for use as lipophilic fluid may be present as one of many possible adjuncts present in the lipophilic fluid-containing composition.

Other suitable lipophilic fluids include, but are not limited to, diol solvent systems e.g., higher diols such as C6- or C8- or higher diols, organosilicone solvents including both cyclic and acyclic types, and the like, and mixtures thereof.

A preferred group of nonaqueous lipophilic fluids suitable for incorporation as a major component of the compositions of the present invention include low-volatility nonfluorinated organics, silicones, especially those other than amino functional silicones, and mixtures thereof. Low volatility nonfluorinated organics include for example OLEAN® and other polyol esters, or certain relatively nonvolatile biodegradable mid-chain branched petroleum fractions.

Another preferred group of nonaqueous lipophilic fluids suitable for incorporation as a major component of the compositions of the present invention include, but are not limited to, glycol ethers, for example propylene glycol methyl ether, propylene glycol n-propyl ether, propylene glycol t-butyl ether, propylene glycol n-butyl ether, dipropylene glycol methyl ether, dipropylene glycol n-propyl ether, dipropylene glycol t-butyl ether, dipropylene glycol n-butyl ether, tripropylene glycol methyl ether, tripropylene glycol n-propyl ether, tripropylene glycol t-butyl ether, tripropylene glycol n-butyl ether. Suitable silicones for use as a major component, e.g., more than 50%, of the composition include cyclopentasiloxanes, sometimes termed "D5", and/or linear analogs having approximately similar volatility, optionally complemented by other compatible silicones. Suitable silicones are well known in the literature, see, for example, Kirk Othmer's Encyclopedia of Chemical Technology, and are available from a number of commercial sources, including General Electric, Toshiba Silicone, Bayer, and Dow Corning. Other suitable lipophilic fluids are commercially available from Procter & Gamble or from Dow Chemical and other suppliers.

Qualification of Lipophilic Fluid and Lipophilic Fluid Test (LF Test)

Any nonaqueous fluid that is both capable of meeting known requirements for a dry-cleaning fluid (e.g, flash point etc.) and is capable of at least partially dissolving sebum, as indicated by the test method described below, is suitable as a lipophilic fluid herein. As a general guideline, perfluorobutylamine (Fluorinert FC-43®) on its own (with or without adjuncts) is a reference material which by definition is unsuitable as a lipophilic fluid for use herein (it is essentially a nonsolvent) while cyclopentasiloxanes have suitable sebum-dissolving properties and dissolves sebum.

The following is the method for investigating and qualifying other materials, e.g., other low-viscosity, free-flowing silicones, for use as the lipophilic fluid. The method uses commercially available Crisc® canola oil, oleic acid (95% pure, available from Sigma Aldrich Co.) and squalene (99% pure, available from J. T. Baker) as model soils for sebum. The test materials should be substantially anhydrous and free from any added adjuncts, or other materials during evaluation.

Prepare three vials, each vial will contain one type of lipophilic soil. Place 1.0 g of canola oil in the first; in a second vial place 1.0 g of the oleic acid (95%), and in a third and final vial place 1.0 g of the squalene (99.9%). To each vial add 1 g of the fluid to be tested for lipophilicity. Separately mix at room temperature and pressure each vial containing the lipophilic soil and the fluid to be tested for 20 seconds on a standard vortex mixer at maximum setting. Place vials on the bench and allow to settle for 15 minutes at room temperature and pressure. If, upon standing, a clear single phase is formed in any of the vials containing lipophilic soils, then the nonaqueous fluid qualifies as suitable for use as a "lipophilic fluid" in accordance with the present invention. However, if two or more separate layers are formed in all three vials, then the amount of nonaqueous fluid dissolved in the oil phase will need to be further determined before rejecting or accepting the nonaqueous fluid as qualified.

In such a case, with a syringe, carefully extract a 200-microliter sample from each layer in each vial. The syringe-extracted layer samples are placed in GC auto sampler vials and subjected to conventional GC analysis after determining the retention time of calibration samples of each of the three models soils and the fluid being tested. If more than 1% of the test fluid by GC, preferably greater, is found to be present in any one of the layers which consists of the oleic acid, canola oil or squalene layer, then the test fluid is also qualified for use as a lipophilic fluid. If needed, the method can be further calibrated using heptacosafluorotributy-lamine, i.e., Fluorinert FC-43 (fail) and cyclopentasiloxane (pass). A suitable GC is a Hewlett Packard Gas Chromatograph HP5890 Series II equipped with a split/splitless injector and FID. A suitable column used in determining the amount of lipophilic fluid present is a J&W Scientific capillary column DB-1HT, 30 meter, 0.25 mm id, 0.1 um film thickness cat# 1221131. The GC is suitably operated under the following conditions:

Carrier Gas: Hydrogen
Column Head Pressure: 9 psi
Flows: Column Flow @ ~1.5 ml/min.
Split Vent @ ~250–500 ml/min.
Septum Purge @ 1 ml/min.
Injection: HP 7673 Autosampler, 10 ul syringe, 1 ul injection
Injector Temperature: 350° C.
Detector Temperature: 380° C.
Oven Temperature Program: initial 60° C. hold 1 min.
rate 25° C./min.
final 380° C. hold 30 min.

Preferred lipophilic fluids suitable for use herein can further be qualified for use on the basis of having an excellent garment care profile. Garment care profile testing is well known in the art and involves testing a fluid to be qualified using a wide range of garment or fabric article components, including fabrics, threads and elastics used in seams, etc., and a range of buttons. Preferred lipophilic fluids for use herein have an excellent garment care profile, for example they have a good shrinkage and/or fabric puckering profile and do not appreciably damage plastic buttons. Certain materials which in sebum removal qualify for use as lipophilic fluids, for example ethyl lactate, can be quite objectionable in their tendency to dissolve buttons, and if such a material is to be used in the compositions of the present invention, it will be formulated with water and/or other solvents such that the overall mix is not substantially damaging to buttons. Other lipophilic fluids, D5, for example, meet the garment care requirements quite admirably. Some suitable lipophilic fluids may be found in granted U.S. Pat. Nos. 5,865,852; 5,942,007; 6,042,617; 6,042,618; 6,056,789; 6,059,845; and 6,063,135, which are incorporated herein by reference.

Lipophilic fluids can include linear and cyclic polysiloxanes, hydrocarbons and chlorinated hydrocarbons, with the exception of PERC and DF2000 which are explicitly not covered by the lipophilic fluid definition as used herein. More preferred are the linear and cyclic polysiloxanes and hydrocarbons of the glycol ether, acetate ester, lactate ester families. Preferred lipophilic fluids include cyclic siloxanes having a boiling point at 760 mm Hg. of below about 250° C. Specifically preferred cyclic siloxanes for use in this invention are octamethylcyclotetrasiloxane, decamethylcyclopentasiloxane, and dodecamethylcyclohexasiloxane. Preferably, the cyclic siloxane comprises decamethylcyclopentasiloxane (D5, pentamer) and is substantially free of octamethylcyclotetrasiloxane (tetramer) and dodecamethylcyclohexasiloxane (hexamer).

However, it should be understood that useful cyclic siloxane mixtures might contain, in addition to the preferred cyclic siloxanes, minor amounts of other cyclic siloxanes including octamethylcyclotetrasiloxane and hexamethylcyclotrisiloxane or higher cyclics such as tetradecamethylcycloheptasiloxane. Generally the amount of these other cyclic siloxanes in useful cyclic siloxane mixtures will be less than about 10 percent based on the total weight of the mixture. The industry standard for cyclic siloxane mixtures is that such mixtures comprise less than about 1% by weight of the mixture of octamethylcyclotetrasiloxane.

Accordingly, the lipophilic fluid of the present invention preferably comprises more than about 50%, more preferably more than about 75%, even more preferably at least about 90%, most preferably at least about 95% by weight of the lipophilic fluid of decamethylcyclopentasiloxane. Alternatively, the lipophilic fluid may comprise siloxanes which are a mixture of cyclic siloxanes having more than about 50%, preferably more than about 75%, more preferably at least about 90%, most preferably at least about 95% up to about 100% by weight of the mixture of decamethylcyclopentasiloxane and less than about 10%, preferably less than about 5%, more preferably less than about 2%, even more preferably less than about 1%, most preferably less than about 0.5% to about 0% by weight of the mixture of octamethylcyclotetrasiloxane and/or dodecamethylcyclohexasiloxane.

The level of lipophilic fluid, when present in the treating compositions according to the present invention, is preferably from about 70% to about 99.99%, more preferably from about 90% to about 99.9%, and even more preferably from about 95% to about 99.8% by weight of the treating composition.

The level of lipophilic fluid, when present in the consumable fabric article treating/cleaning compositions according to the present invention, is preferably from about 0.1% to about 90%, more preferably from about 0.5% to about 75%, and even more preferably from about 1% to about 50% by weight of the consumable fabric article treating/cleaning composition.

Lipophilic Fluid Adjuncts

During fabric treating processes utilizing lipophilic fluids, the lipophilic fluids typically end up containing contaminant components and/or contaminants, water and/or other "non-lipophilic fluid materials".

a. Contaminant Component

Contaminant components and/or conventional contaminants may become mixed with the lipophilic fluid as a result of a fabric treating process utilizing both materials or may be added to a lipophilic fluid prior to using the lipophilic fluid for a fabric treating process. How the contaminant component and/or conventional contaminant comes to be present in the lipophilic fluid is not particularly important for the present invention. This present invention addresses the problem of removing the contaminant component and/or conventional contaminants from the lipophilic fluid.

Contaminant components (i.e., materials that have properties similar to contaminants) and conventional contaminants that may be present in the contaminant-containing lipophilic fluid of the present invention include, but are not limited to, conventional contaminants, surfactants, dyes, lipids, soils, water, and other non-lipophilic fluid materials.

Nonlimiting examples of these other contaminants include conventional anionic, nonionic, cationic and zwitterionic contaminants.

Contaminants included in the treating compositions afforded by the present invention comprise at least 0.01%, preferably at least about 0.1%, more preferably at least about 0.5%, even more preferably at least about 1%, most preferably at least about 3% to about 80%, more preferably to about 60%, most preferably to about 50% by weight of composition depending upon the particular contaminants used and the desired effects to be achieved.

The contaminant can be nonionic, anionic, amphoteric, amphophilic, zwitterionic, cationic, semi-polar nonionic, and mixtures thereof, nonlimiting examples of which are disclosed in U.S. Pat. Nos. 5,707,950 and 5,576,282. A typical listing of anionic, nonionic, amphoteric and zwitterionic classes, and species of these contaminants, is given in U.S. Pat. No. 3,664,961 issued to Norris on May 23, 1972. Preferred compositions comprise nonionic contaminants and/or mixtures of nonionic contaminants with other contaminants, especially anionic contaminants.

Nonlimiting examples of contaminants useful herein include the conventional $C_8$–$C_{18}$ alkyl ethoxylates ("AE"), with EO about 1–22, including the so-called narrow peaked alkyl ethoxylates and $C_6$–$C_{12}$ alkyl phenol alkoxylates (especially ethoxylates and mixed ethoxy/propoxy), alkyl dialkyl amine oxide, alkanoyl glucose amide, $C_{11}$–$C_{18}$ alkyl benzene sulfonates and primary, secondary and random alkyl sulfates, the $C_{10}$–$C_{18}$ alkyl alkoxy sulfates, the $C_{10}$–$C_{18}$ alkyl polyglycosides and their corresponding sulfated polyglycosides, $C_{12}$–$C_{18}$ alpha-sulfonated fatty acid esters, $C_{12}$–$C_{18}$ alkyl and alkyl phenol alkoxylates (especially ethoxylates and mixed ethoxy/propoxy), $C_{12}$–$C_{18}$ betaines, schercotaines and sulfobetaines ("sultaines"), $C_{10}$–$C_{18}$ amine oxides, and the like. Other conventional useful contaminants are listed in standard texts.

The contaminant components and/or contaminants may include the following nonlimiting examples:
a) Anionic contaminants (e.g., alkyl or aryl sulfates, aerosol derivatives, etc)
b) Cationic or basic contaminants (e.g., quaternary contaminants, primary and secondary amines, etc.)
c) Non-ionic contaminants (e.g., Brij contaminants, Neodol contaminants, etc.)

The contaminant component of the present invention may be a material that is capable of suspending water in a lipophilic fluid and enhancing soil removal benefits of a lipophilic fluid. As a condition of their performance, said materials are soluble in the lipophilic fluid.

One class of materials can include siloxane-based surfactants (siloxane-based materials). The siloxane-based surfactants in this application may be siloxane polymers for other applications. The siloxane-based surfactants typically have a weight average molecular weight from 500 to 20,000. Such materials, derived from poly(dimethylsiloxane), are well known in the art. In the present invention, not all such siloxane-based surfactants are suitable, because they do not provide improved cleaning of soils compared to the level of cleaning provided by the lipophilic fluid itself.

Suitable siloxane-based surfactants comprise a polyether siloxane having the formula:

wherein a is 0–2; b is 0–1000; c is 0–50; d is 0–50, provided that a+c+d is at least 1;

M is $R^1{}_{3-e}X_eSiO_{1/2}$ wherein $R^1$ is independently H, or a monovalent hydrocarbon group, X is hydroxyl group, and e is 0 or 1;

M' is $R^2{}_3SiO_{1/2}$ wherein $R^2$ is independently H, a monovalent hydrocarbon group, or $(CH_2)_f$—$(C6H4)_g$O—$(C_2H_4O)_h$—$(C_3H_6O)_i$ —$(C_kH_{2k}O)_j$—$R^3$, provided that at least one $R^2$ is $(CH_2)_f$—$(C6H4)_g$O—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1–10, g is 0 or 1, h is 1–50, i is 0–50, j is 0–50, k is 4–8;

D is $R^4{}_2SiO_{2/2}$ wherein $R^4$ is independently H or a monovalent hydrocarbon group;

D' is $R^5{}_2SiO_{2/2}$ wherein $R^5$ is independently $R^2$ provided that at least one $R^5$ is $(CH_2)_f$—$(C6H4)_g$O—$(C_2H_4O)_h$—$(C_3H_6O)_i$—$(C_kH_{2k}O)_j$—$R^3$, wherein $R^3$ is independently H, a monovalent hydrocarbon group or an alkoxy group, f is 1–10, g is 0 or 1, h is 1–50, i is 0–50, j is 0–50, k is 4–8; and D" is $R^6{}_2SiO_{2/2}$ wherein $R^6$ is independently H, a monovalent hydrocarbon group or $(CH_2)_l(C_6H_4)_m(A)_n$-$[(L)_o$-$(A')_p$-$]_q$-$(L')_r Z(G)_s$, wherein l is 1–10; m is 0 or 1; n is 0–5; o is 0–3; p is 0 or 1; q is 0–10; r is 0–3; s is 0–3; $C_6H_4$ is unsubstituted or substituted with a $C_{1-10}$ alkyl or alkenyl; A and A' are each independently a linking moiety representing an ester, a keto, an ether, a thio, an amido, an amino, a $C_{1-4}$ fluoroalkyl, a $C_{1-4}$ fluoroalkenyl, a branched or straight chained polyalkylene oxide, a phosphate, a sulfonyl, a sulfate, an ammonium, and mixtures thereof; L and L' are each independently a $C_{1-30}$ straight chained or branched alkyl or alkenyl or an aryl which is unsubstituted or substituted; Z is a hydrogen, carboxylic acid, a hydroxy, a phosphato, a phosphate ester, a sulfonyl, a sulfonate, a sulfate, a branched or straight-chained polyalkylene oxide, a nitryl, a glyceryl, an aryl unsubstituted or substituted with a $C_{1-30}$alkyl or alkenyl, a carbohydrate unsubstituted or substituted with a $C_{1-10}$alkyl or alkenyl or an ammonium; G is an anion or cation such as $H^+$, $Na^+$, $Li^+$, $K^+$, $NH_4^+$, $Ca^{+2}$, $Mg^{+2}$, $Cl^-$, $Br^-$, $I^-$, mesylate or tosylate.

Examples of the types of siloxane-based surfactants described herein above may be found in EP-1,043,443A1, EP-1,041,189 and WO-01/34,706 (all to GE Silicones) and U.S. Pat. Nos. 5,676,705, 5,683,977, 5,683,473, and EP-1,092,803A1 (all to Lever Brothers).

Nonlimiting commercially available examples of suitable siloxane-based surfactants are TSF 4446 (ex. General Electric Silicones), XS69-B5476 (ex. General Electric Silicones); Jenamine HSX (ex. DelCon) and Y12147 (ex. OSi Specialties).

A second preferred class of materials suitable for the surfactant component is organic in nature. Preferred materials are organosulfosuccinate surfactants, with carbon chains of from about 6 to about 20 carbon atoms. Most preferred are organosulfosuccinates containing dialkly chains, each with carbon chains of from about 6 to about 20 carbon atoms. Also preferred are chains containing aryl or alkyl aryl, substituted or unsubstituted, branched or linear, saturated or unsaturated groups.

Nonlimiting commercially available examples of suitable organosulfosuccinate surfactants are available under the trade names of Aerosol OT and Aerosol TR-70 (ex. Cytec).

The surfactant component, when present in the fabric article treating compositions of the present invention, preferably comprises from about 0.01% to about 10%, more preferably from about 0.02% to about 5%, even more preferably from about 0.05% to about 2% by weight of the fabric article treating composition.

The surfactant component, when present in the consumable detergent compositions of the present invention, preferably comprises from about 1% to about 99%, more preferably 2% to about 75%, even more preferably from about 5% to about 60% by weight of the consumable detergent composition.

A second preferred class of materials suitable for the surfactant component is organic in nature. Again, solubility in the lipophilic fluid, as identified above, is essential. Preferred materials are organosulfosuccinate surfactants, with carbon chains of from about 6 to about 20 carbon atoms.

Nonlimiting commercially available examples of suitable organosulfosuccinate surfactants are available under the trade names of Aerosol OT and Aerosol TR-70 (ex. Cytec).

Another preferred class of surfactants is nonionic surfactants, especially those having low HLB values. Preferred nonionic surfactants have HLB values of less than about 10, more preferably less than about 7.5, and most preferably less than about 5. Preferred nonionic surfactants also have from about 6–20 carbons in the surfactant chain and from about 1–15 ethylene oxide (EO) and/or propylene oxide (PO) units in the hydrophilic portion of the surfactant (i.e., C6–20 EO/PO 1–15), and preferably nonionic surfactants selected from those within C7–11 EO/PO 1–5 (e.g., C7–11 EO 2.5).

The surfactant laundry additives, when present, typically comprises from about 0.001% to about 10%, more preferably from about 0.01% to about 5%, even more preferably from about 0.02% to about 2% by weight of the cleaning composition combined with the lipophilic fluid for the present invention process. These surfactant laundry additives, when present in the consumable detergent compositions before addition to the lipophilic fluid, preferably comprises from about 1% to about 90%, more preferably 2% to about 75%, even more preferably from about 5% to about 60% by weight of the consumable detergent composition.

In one embodiment, the treating agent is insoluble in water. In another embodiment, the treating agent is insoluble in water, but soluble in a lipophilic fluid. In yet another embodiment, the treating agent is insoluble in water, soluble in a lipophilic fluid and has an HLB of from about 1 to about 9 or from about 1 to about 7 or from about 1 to about 5.

In still another embodiment, the treating agent is insoluble in water and insoluble in a lipophilic fluid. In still yet another embodiment, the treating agent in conjunction with a solubilizing agent is at least partially soluble in a lipophilic fluid and/or water. In the solubilizing agent embodiment, the treating agent is present at a level in the treating composition at from about 0.001% to about 5% or from about 0.001% to about 3% or from about 0.001% to about 1% by weight of the treating composition.

Nonlimiting examples of suitable treating agents include treating agents commercially available from Dow Corning under tradenames such as DC1248, SF1528 DC5225C and DCQ4 3667; and Silwets from Witco under tradenames such as L8620, L7210, L7220.

The contaminant component, when present in the contaminant-containing lipophilic fluid can be present at any level, typically the contaminant component is present at a level of from about 0.01% to about 10%, more preferably from about 0.02% to about 5%, even more preferably from about 0.05% to about 2% by weight of the contaminant-containing lipophilic fluid.

Another contaminant component/contaminant that may be present in the contaminant-containing lipophilic fluid is characterized as non-silicone additives. The non-silicone additives preferably comprise a strongly polar and/or hydrogen-bonding head group. Examples of the strongly polar and/or hydrogen-bonding head group are alcohols, carboxylic acids, sulfates, sulphonates, phosphates, phosphonates, and nitrogen containing materials. Preferred non-silicone additives are nitrogen containing materials selected from the group consisting of primary, secondary and tertiary amines, diamines, triamines, ethoxylated amines, amine oxides, amides, betaines (nonlimiting examples of betaines are Schercotaine materials commercially available from Scher Chemicals), cationic materials such as cationic surfactants and/or quaternary surfactants and/or quaternary ammonium salts such as ammonium chlorides (nonlimiting examples of ammonium chlorides are Arquad materials commercially available from Akzo Nobel and/or Varisoft materials from Goldschmidt) and cationic fabric softening actives, nonionic materials such as nonionic surfactants (i.e., alcohol ethoxylates, polyhydroxy fatty acid amides), gemini surfactants, anionic surfactants, zwitterionic surfactants and mixtures thereof. Alkylamines are particularly preferred. Additionally, branching on the alkyl chain to help lower the melting point is highly preferred. Even more preferred are primary alkylamines comprising from about 6 to about 22 carbon atoms.

Particularly preferred primary alkylamines are oleylamine (commercially available from Akzo under the trade name Armeen OLD), dodecylamine (commercially available from Akzo under the trade name Armeen 12D), branched $C_{16}$–$C_{22}$ alkylamine (commercially available from Rohm & Haas under the trade name Primene JM-T) and mixtures thereof.

In another embodiment, the contaminant-containing lipophilic fluid comprises a contaminant selected from the group consisting of anionic contaminants, cationic contaminants, nonionic contaminants, zwitterionic contaminants and mixtures thereof.

The non-silicone additives, when present in the treating compositions of the present invention, preferably comprises from about 0.01% to about 10%, more preferably from about 0.02% to about 5%, even more preferably from about 0.05% to about 2% by weight of the treating composition.

Polar Solvent

The contaminant-containing lipophilic fluid of the present invention may comprise a polar solvent. Non-limiting examples of polar solvents include: water, alcohols, glycols, polyglycols, ethers, carbonates, dibasic esters, ketones, other oxygenated solvents, and mixtures thereof. Further examples of alcohols include: C1–C126 alcohols, such as propanol, ethanol, isopropyl alcohol, etc. . . . , benzyl alcohol, and diols such as 1,2-hexanediol. The Dowanol series by Dow Chemical are examples of glycols and polyglycols useful in the present invention, such as Dowanol TPM, TPnP, DPnB, DPnP, TPnB, PPh, DPM, DPMA, DB, and others. Further examples include propylene glycol, butylene glycol, polybutylene glycol and more hydrophobic glycols. Examples of carbonate solvents are ethylene, propylene and butylene carbonantes such as those available under the Jeffsol tradename. Polar solvents for the present invention can be further identified through their dispersive ($\square_D$), polar ($\square_P$) and hydrogen bonding ($\square_H$) Hansen solubility parameters. Preferred polar solvents or polar solvent mixtures have fractional polar ($f_P$) and fractional hydrogen bonding ($f_H$) values of $f_P > 0.02$ and $f_H > 0.10$, where $f_P = \square_P/(\square_D + \square_P + \square_H)$ and $f_H = \square_H/(\square_D + \square_P + \square_H)$, more preferably $f_P > 0.05$ and $f_H > 0.20$, and most preferably $f_P > 0.07$ and $f_H > 0.30$.

Polar solvent may be present in the contaminant-containing lipophilic fluid at any level, typically it is present in the contaminant-containing lipophilic fluid at a level of from about 0.001% to about 10%, more preferably from about 0.005% to about 5%, even more preferably from about 0.01% to about 1% by weight of the contaminant-containing lipophilic fluid.

In one embodiment, the contaminant-containing lipophilic fluid comprises from about 0% to about 5% or from about 0% to about 3% or from about 0.0001% to about 1% by weight of the contaminant-containing lipophilic fluid of a polar solvent.

In the treating composition of the present invention, the levels of polar solvent can be from about 0 to about 70%, preferably 1 to 50%, even more preferably 1 to 30% by weight of the detergent composition.

Multifunctional Filter

The multifunctional filter of the present invention comprises a removal component that is capable of removing a material from a filtrate; and an addition component capable of adding a material to a filtrate. The removal component and/or addition component may comprise an adsorbent material and/or an absorbent material.

The removal component and addition component may be present in the same filter zone. Alternatively, the removal component and addition component may be present in separate, discrete filter zones or can be a mixture of these forms.

In one embodiment, the multifunctional filter comprises a dual adsorption zone (containing polar and apolar adsorbents) and a desorption or controlled release zone. The adsorption zone filters both water-soluble and lipophilic-soluble contaminants from the liquid, while the controlled release zone delivers an active (e.g. perfume, biocide) to the "purified" liquid. The cartridge acts both as a filtration and as a delivery device.

In another embodiment, the multifunctional filter is replaceable.

In yet another embodiment, the multifunctional filter is reusable.

In still another embodiment, the removal component and addition component are physically separated from one another by an intermediate component.

In even still another embodiment, the removal component is physically separated from other removal components by an intermediate component.

In still yet another embodiment, the addition component is physically separated from other addition components by an intermediate component.

Typically, the intermediate component comprises a fluid permeable material.

It is desirable that removal component and addition component are housed within a filter housing. The filter housing typically comprises an external wall that substantially encases the removal component and addition component.

In a filter embodiment in accordance with the present invention, a filter comprising:

a. a housing comprising an in-flow port through which a filtrate enters the filter and an out-flow port through which the filtrate exits the filter;

b. a filtering material housed within said housing, wherein the filtering material is pleated in a fanfold manner and positioned within the filter such that the filtrate contacts the filtering material as it passes from the in-flow port to the out-flow port;

c. a removal component for removing a material from the filtrate, wherein the removal component is dispersed throughout and fixed to the filtering material; and d. an addition component for adding a material to the filtrate is provided.

It is desirable that the multifunctional filter of the present invention comprises an end-of-use indicator to indicate when the filter needs replaced.

a. Removal Component

The removal component typically comprises an adsorbent material.

b. Addition Component

The addition component typically comprises porous particle loaded with an active. It is desirable that the addition component comprises a release agent, preferably a controlled release agent, that capable of being added into the filtrate that comes into contact with the addition component.

Non-limiting examples of suitable release agents include perfumes, biocides, corrosion inhibitors, finishing agents such as anti-static agents, fabric softening agents and mixtures thereof.

In one embodiment, the release agent is releasably associated with a substrate or carrier.

Adsorbent Material

The adsorbent material useful in the processes of the present invention comprises a polar agent and an apolar agent. Typically, the polar agents and apolar agents are present in the adsorbent material at a ratio of from about 1:10 to about 10:1 or from about 1:5 to about 5:1 or from about 1:2 to about 3:1.

In one embodiment, the adsorbent material has a surface area of from about 10 $m^2$/gram to about 1000 $m^2$/gram or from about 100 $m^2$/gram to about 1000 $m^2$/gram or from about 250 $m^2$/gram to about 1000 $m^2$/gram or even about 500 $m^2$/gram to about 1000 $m^2$/gram.

In one embodiment, the adsorbent material has an average particle size of from about 0.1 µm to about 250 µm.

In another embodiment, the adsorbent material has an average particle size of from about 0.1 µm to about 500 µm.

In another embodiment, the adsorbent material comprises a polar and apolar agent and another agent selected from the group consisting of: a polar agent, an apolar agent and optionally, a charged agent, wherein two or more agents are in the form of commingled agents in a unitary physical form.

In yet another embodiment, the adsorbent material comprises a polar and apolar agent and another agent selected from the group consisting of: a polar agent, an apolar agent and optionally, a charged agent, wherein two or more agents are in the form of layered agents.

In still another embodiment, the adsorbent material comprises a separate, discrete polar and apolar agent and a separate, discrete charged agent, such that the contaminant-containing lipophilic fluid contacts both the separate, discrete agents.

In still yet another embodiment, the adsorbent material comprises discrete particles.

In even still another embodiment, the adsorbent material is in the form of discrete particles.

Alternatively, the adsorbent material is in the form of a fibrous structure. Typically the fibrous structure is a non-woven fibrous structure. However, it could be a woven fibrous structure.

In another embodiment, the adsorbent material is in the form of discrete particles that are embedded in and/or coated on and/or impregnated in and/or bound to a fibrous structure.

The adsorbent material may comprise (1) charged agents and (2) polar and apolar agents commingled together. The polar agents are typically in the form of discrete particles and the apolar agents are typically in the form of a fibrous structure, wherein the discrete particle polar agents are embedded in and/or coated on and/or impregnated in and/or bound to a fibrous structure, typically a non-woven fibrous structure.

a. Polar Agents

In one embodiment, a polar agent useful in the adsorbent material of the present invention has the formula:

$Y_a$—$O_b X$ wherein Y is Si, Al, Ti, P; a is from about 1 to about 5; b is from about 1 to about 10; and X is a metal.

In another embodiment, a polar agent suitable for use in the adsorbent material of the present invention is selected from the group consisting of: silica, diatomaceous earth, aluminosilicates, polyamide resin, alumina, hydrogels, zeolites and mixtures thereof. Preferably, the polar agent is silica, more specifically silica gel.

Nonlimiting examples of monomers that comprise the hydrogels of the present invention include hydroxyalkyl acrylates, hydroxyalkyl methacrylates, N-substituted acrylamides, N-substituted methacrylamides, N-vinyl-2-pyrrolidone, N-acroylpyrrolidone, acrylics, methacrylics, vinyl acetate, acrylonitrile, styrene, acrylic acid, methacrylic acid, crotonic acid, sodium styrene sulfonate, sodium 2-sulfoxyethyl methacrylate, 2-acrylamido-2-methylpropanesulfonic acid, vinylpyridine, aminoethyl methacrylates, 2-methacryloyloxytrimethylammonium chloride, N,N'-methylenebisacrylamide, poly(ethylene glycol) dimethacrylate, 2,2'-(p-phenylenedioxy diethyl dimethacrylate, divinylbenzene and triallylamine.

In yet another embodiment, a polar agent suitable for use in the adsorbent material of the present invention has an average particle size of from about 0.5 μm to about 500 μm.

b. Apolar Agents

Apolar agents suitable for use in the adsorbent material of the present invention comprise one or more of the following: activated carbon, polystyrene, polyethylene, and/or divinyl benzene. The activated carbon may be in powdered form and/or has a surface area of from about 50 m²/gram to about 200 m²/gram, typically its around about 75 m²/gram to about 125 m²/gram m²/gram.

c. Charged Agents

In one embodiment, the charged agent is selected from the group consisting of: anionic materials, cationic materials, zwitterionic materials and mixtures thereof.

In another embodiment, the charged agent has the formula:

[W-Z]T wherein W is Si, Al, Ti, P, or a polymer backbone; Z is a charged substituent group and T is a counterion selected from alkaline, alkaline earth metals and mixtures thereof. For example, T may be: Sodium, potassium, ammonium, alkylammonium derivatives, hydrogen ion; chloride, hydroxide, fluoride, iodide, carboxylate, etc.

The polymer backbone is typically comprises a material selected from the group consisting of: polystryrene, polyethylene, polydivinyl benzene, polyacrylic acid, polyacrylamide, polysaccharide, polyvinyl alcohol, copolymers of these and mixtures thereof.

The charged substituent typically comprises sulfonates, phosphates, quaternary ammonium salts and mixtures thereof. The charged substituent may comprise alcohols; diols; salts of carboxylates; salts of primary and secondary amines and mixtures thereof.

The W typically comprises from about 1% to about 15% by weight of W of the charged agent.

In another embodiment, the charged agent is capable of regeneration such that the charged agent can release any contaminant that it temporarily removes from the contaminant-containing lipophilic fluid upon being exposed to an environmental condition. An "environmental condition" as used herein means any physical or chemical condition that causes the charged agent to release the contaminant. Nonlimiting examples of environmental conditions include exposing the charged agent to an acid, a base and/or a salt. The charged agents that are capable of regeneration typically exhibit a $pK_a$ or $pK_b$ of from about 2 to about 8. Charged agents that are capable of regeneration can be reused for multi-cycle contaminant removal from lipophilic fluids.

Use of the Multifunctional Filter

The multifunctional filter may be used in any suitable manner know to those in the art.

In one embodiment, the multifunctional filter is used in association with an apparatus, such as a fabric article treating apparatus, especially a lipophilic fluid system fabric article treating apparatus. A nonlimiting example of such an apparatus comprises:
  a. a filter according to the present invention; and
  b. a filtrate source in fluid communication with the filter such that the filtrate contacts the filter.

Processes

The present invention also encompasses a process for treating a filtrate comprising contacting the filter according to the present invention with the filtrate.

The resulting filtrate produced by the process according to the present invention is also within the scope of the present invention.

Figure 2:
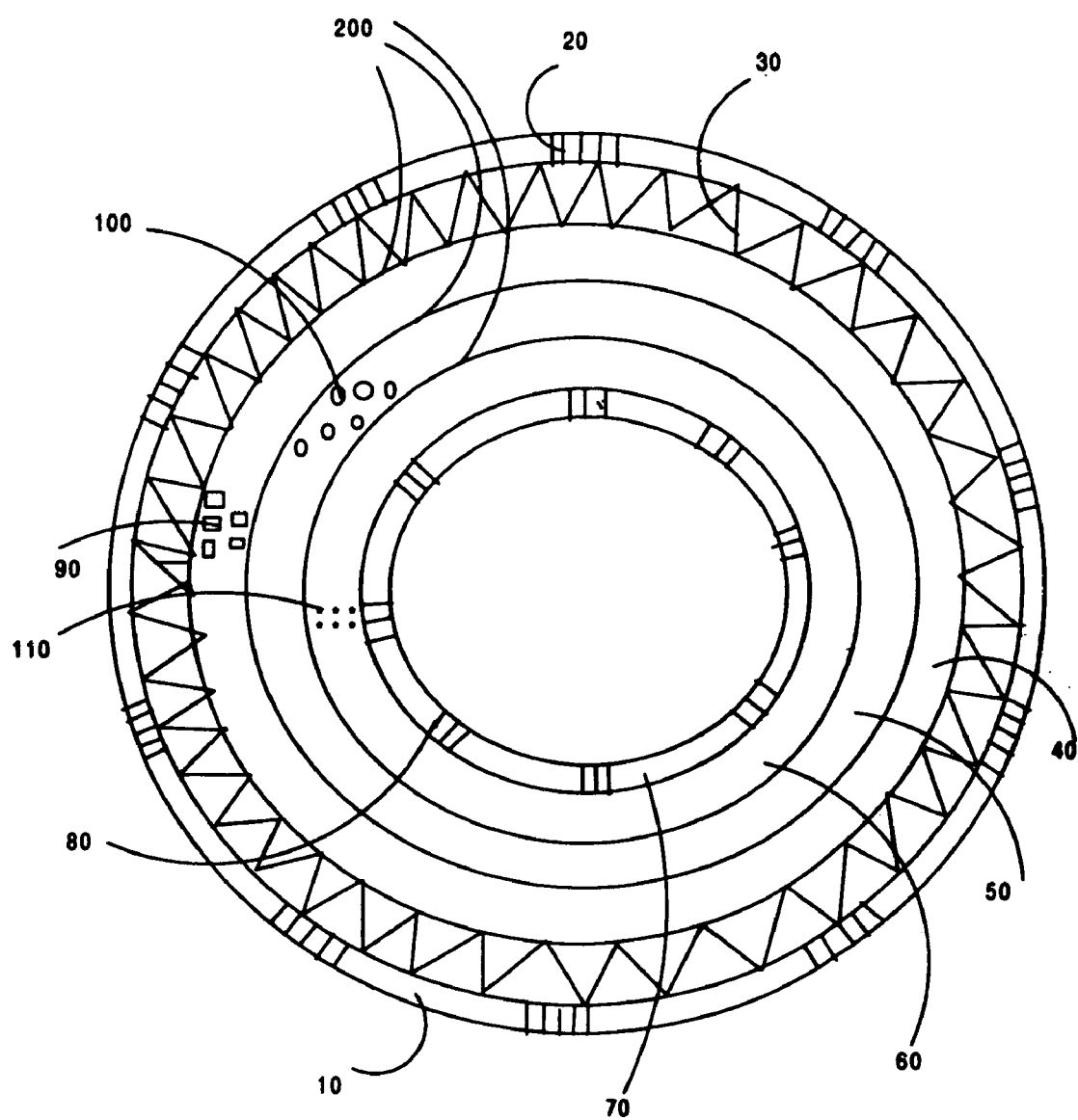
FIG. 2 is a cross-sectional view of the multifunctional filter of FIG. 1 along line 2—2.

Description for FIG. 1–2:

The filter cartridge 5 includes a rigid apertured cylindrical external filter media cage 10 in which a rigid apertured internal cylindrical core element 70 having a central passageway 180 is coaxially disposed. Within the interior space between the cage 10 and the core element 70 we have several distinctive zones separated by a fluid-permeable element 200.

In the first zone, closest to the cage, we have a longitudinally pleated filter media 30 placed such that the individual pleats are oriented radially relative to the filter cartridge's longitudinal axis. The rigid external filter media cage 10 and the rigid core element 70 are each provided with apertures 20,80 so as to allow fluid to flow therethrough.

In the second zone 40, we have an polar adsorbent 90. In the third zone 50, we738 have an apolar adsorbent 100. In the fourth zone 60 we have a controlled release active 110.

As such the fluid may flow normally through the external cage 10, the 1,2,3,4 zone and the central core element 70, in that order, and the discharge from the filter cartridge 5 through a central passageway 180.

Figure 3:
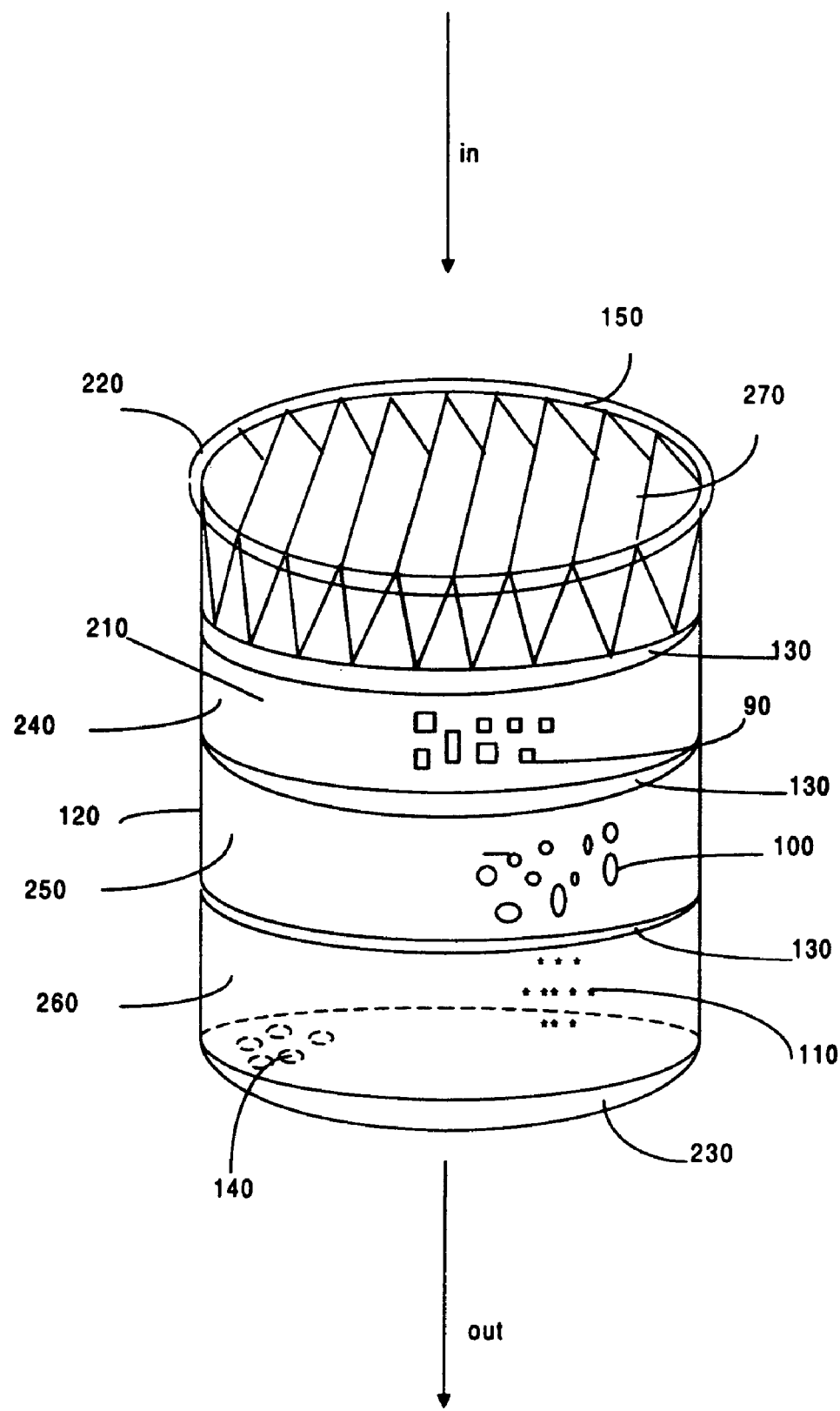
FIG. 3 is a perspective view of another embodiment of a multifunctional filter in accordance with the present invention.

Description for FIG. 3:

The filter cartridge 210 includes a rigid fluid-impermeable, tubular shaped support body with a top 220 and a bottom flange 230. The flanges 220,230 optionally contain an annular groove 150 to hold a sealing ring. The flanges 220, 230 are apertured 140 and as such the liquid might flow along the longitudinal axis of the filter cartridge 210.

Layered between the two flanges are 4 distinctive zones, oriented in a planar mode as such that the liquid flows perpendicular through the zones. Zones are each separated by an fluid-permeable element 130.

In the first zone 240, closest to the top flange 220, we have a radially pleated filter media 270 placed such that the individual pleats are oriented perpendicular relative to the filter cartridge's longitudinal axis. In the second zone 240, we have an polar adsorbent 90. In the third zone 250, we have an apolar adsorbent 100. In the fourth zone 260 we have a controlled release active 110 such as e.g. chlorhexadine acetate, which is not soluble in water and can be purchased as a granular material that has very high broad spectrum antimicrobial capability.

What is claimed is:

1. A process for treating a contaminant-containing lipophilic fluid comprising:
    contacting a lipophilic fluid comprising at least one contaminant with a multifunctional filter comprising a removal component that is capable of removing a material from a filtrate, said removal component comprising a polar agent, an apolar agent and a charged agent, and said filter also comprising an addition component that is capable of adding a material to a filtrate; wherein the lipophilic fluid is selected from the group consisting of C6 or higher diols, cyclic or acyclic organosilicones, glycol ethers, perfluorinated amines, and mixtures thereof; and the addition component comprises a releasing agent selected from the group consisting of perfumes, antistatic agents, fabric softening agents, and mixtures thereof, wherein said removal component and said addition component are present in separate, discrete zones in said filter, whereby the lipophilic fluid is purified by said removal component and the purified fluid contacts said addition component.

2. The process according to claim 1 wherein the contaminant is selected from the group consisting of surfactants, dyes, lipids, soils, water, non-silicone additives containing nitrogen and a polar or hydrogen bonding bead group, and mixtures thereof.

3. The process according to claim 1 where in the lipophilic fluid comprises a cyclic organosilicone.

4. The process according to claim 1 wherein the lipophilic fluid comprises a cyclic organosilicone selected from the group consisting of octamethylcyclotetrasiloxane, decamethylcyclopentasiloxane, dodecamethylcyclohexasiloxane, and mixtures thereof.

5. The process according to claim 1 wherein the lipophilic fluid comprises decamethylcyclopentasiloxane.

6. The process according to claim 1 wherein the polar agent has the formula:

$Y_a$—$O_b X$ wherein Y is Si, Al, Ti, P; a is from about 1 to about 5; b is from about 1 to about 10; and X is a metal.

7. The process according to claim 1 wherein the polar agent is selected from the group consisting of silica, diatomaceous earth, aluminosilicates, polyamide resin, alumina, hydrogels, zeolites and mixtures thereof.

8. The process according to claim 7 wherein the polar agent comprises silica gel.

9. The process according to claim 1 wherein the apolar agent is selected from the group consisting of activated carbon, polystyrene, polyethylene, polydivinylbenzene and mixtures thereof.

10. The process according to claim 1 wherein the charged agent has the formula:

[W-Z]T wherein W is Si, Al, Ti, P, or a polymer backbone; Z is a charged substituent group and T is a counterion selected from alkaline, alkaline earth metals and mixtures thereof.

11. The process according to claim 10 wherein the polymer backbone is selected from the group consisting of polystyrene, polyethylene, polydivinyl benzene, polyacrylic acid, polyacrylamide, polysaccharide, polyvinyl alcohol, copolymers of these and mixtures thereof.

12. The process according to claim 10 wherein the charged substituent comprises sulfonates, phosphates, quaternary ammonium salts and mixture thereof.

13. The process according to claim 10 wherein the charged substituent is selected from the group consisting of alcohols; diols; salts of carboxylates, primary amines, secondary amines and mixtures thereof.

14. The process according to claim 10 wherein W comprises from about 1% to about 15% by weight of the charged agent.

15. The process according to claim 10 wherein said charged agent is capable of regeneration such that the charged agent can release the contaminant that it removes upon being exposed to an environmental condition.

16. The process according to claim 10 wherein said charged agent exhibits a $pK_a$ or $pK_b$ of from about 2 to about 8.

17. The process according to claim 10 wherein the charged agent releases the contaminant upon being exposed to one or more of the following: acids, bases and salts.

18. The process according to claim 1 wherein the removal component and addition component are housed within a filter housing.

19. The process according to claim 18 wherein the filter housing comprises an external wall that substantially encases the removal component and addition component.

* * * * *

UNITED STATES PATENT AND TRADEMARK OFFICE
CERTIFICATE OF CORRECTION

PATENT NO. : 7,247,241 B2 Page 1 of 1
APPLICATION NO. : 11/199977
DATED : July 24, 2007
INVENTOR(S) : France et al.

It is certified that error appears in the above-identified patent and that said Letters Patent is hereby corrected as shown below:

Column 5

Line 4, delete "Crisc®" and insert -- Crisco® --.

Column 15

Line 4 of Claim 2, delete "bead" and insert -- head --.

Line 8, delete "738".

Signed and Sealed this

Fifteenth Day of April, 2008

JON W. DUDAS
*Director of the United States Patent and Trademark Office*